(12) United States Patent
Kertesz

(10) Patent No.: US 8,303,877 B2
(45) Date of Patent: Nov. 6, 2012

(54) METHOD FOR MANUFACTURING A SOCKET

(75) Inventor: Janos Kertesz, Hofheim (DE)

(73) Assignee: Norma Germany GmbH, Maintal (DE)

( * ) Notice: Subject to any disclaimer, the term of this patent is extended or adjusted under 35 U.S.C. 154(b) by 1954 days.

(21) Appl. No.: 11/299,345

(22) Filed: Dec. 10, 2005

(65) Prior Publication Data

US 2006/0141838 A1    Jun. 29, 2006

(30) Foreign Application Priority Data

Dec. 24, 2004 (DE) .......................... 10 2004 062 587
Sep. 8, 2005 (DE) .......................... 10 2005 042 678

(51) Int. Cl.
*B29C 47/02* (2006.01)

(52) U.S. Cl. ........ 264/255; 264/294; 264/513; 264/523; 264/537; 264/544

(58) Field of Classification Search .................. 264/262
See application file for complete search history.

(56) References Cited

U.S. PATENT DOCUMENTS

| | | | |
|---|---|---|---|
| 6,398,059 B1 * | 6/2002 | Hayashi et al. ............... | 220/562 |
| 6,475,424 B1 | 11/2002 | Van Manen | |
| 2001/0013675 A1 | 8/2001 | Nakagawa | |
| 2002/0136864 A1 * | 9/2002 | Brandner et al. ............. | 428/156 |
| 2004/0051305 A1 * | 3/2004 | Kertesz ........................ | 285/21.1 |
| 2005/0115054 A1 * | 6/2005 | Brandner et al. ............... | 29/592 |

FOREIGN PATENT DOCUMENTS

| | | |
|---|---|---|
| DE | 1 629 710 | 2/1971 |
| DE | 42 39 909 | 5/1994 |
| DE | 1 095 962 | 5/2001 |
| DE | 199 53 746 | 10/2001 |
| DE | 10144892 | 3/2003 |
| DE | 10241286 | 3/2004 |
| EP | 1 323 973 | 7/2003 |
| GB | 2255554 A * | 11/1992 |
| GB | 2 267 678 | 12/1993 |
| JP | 05131441 A * | 5/1993 |
| JP | 2003072399 | 3/2003 |
| WO | 2004069574 | 8/2004 |
| WO | WO 2004069574 A1 * | 8/2004 |

* cited by examiner

*Primary Examiner* — William Bell
(74) *Attorney, Agent, or Firm* — Lucas & Mercanti, LLP; Klaus P. Stoffel

(57) ABSTRACT

In a method for manufacturing a socket for connecting a fluid conduit to a container made from thermoplastic synthetic material, wherein the socket has a first socket-shaped material arrangement of at least one layer and a second socket-shaped material arrangement of at least one layer, wherein the first material arrangement is thinner than the second material arrangement and the first and second material arrangements are both made of thermoplastic material at least predominantly and fuse with one another to form a fused joint, the first material arrangement is molded by extrusion or injection molding to a plane film or plate or to a hose. The film or plate is deepdrawn or the hose is blowmolded to a first preform with a socket contour. The second material arrangement is applied onto one side of the first preform in a socket contour by injection molding, coinjection or a monosandwich process.

20 Claims, 11 Drawing Sheets

METHOD FOR MANUFACTURING A SOCKET

BACKGROUND OF THE INVENTION

1. Field of the Invention

The invention relates to a method for manufacturing a socket for connecting a fluid conduit to a container made from thermoplastic synthetic material wherein the socket has a first socket-shaped material arrangement comprising at least one layer and a second socket-shaped material arrangement comprising at least one layer, wherein the first material arrangement is thinner than the second material arrangement and both comprise a thermoplastic material at least as the predominant component and fuse with one another to form a fused joint.

2. Description of the Related Art

Such a method is disclosed in DE 199 53 746 C2. Here, the first material arrangement is comprised of two neighboring thin layers and the second arrangement is comprised of an outer layer that is thicker than the two-layer first material arrangement and determines essentially the mechanical strength of the socket. The three layers are to be injection molded by co-injection or monosandwich process. However, in this connection, it is extremely difficult to produce the single-layer first material arrangement to be significantly thicker than the second material arrangement because then the two layers of an overall three-layer wall of a socket form a thin one-part or two-part skin layer whose total wall thickness in general is less than that of the core layer. For example, the skin layer in the case of co-injection usually has a thickness of maximally approximately 2 mm. When for reasons of strength the wall thickness of the socket is, for example, approximately 10 mm and the thickest layer is to be positioned externally, it is practically impossible to produce such a layer arrangement by co-injection or monosandwich process.

On the other hand, many materials cannot be injection-molded by a single injection process in multiple layers, be it by coextrusion or directly sequentially, as long as the previously injected layer is still molten. For example, first injecting an aluminum layer and directly subsequent thereto, while the aluminum layer is still molten, injecting a synthetic material layer is not possible because aluminum has a much higher melting temperature than synthetic material so that the synthetic material would not withstand such a high temperature. Similar conditions apply in the case of materials with different flow behavior.

SUMMARY OF THE INVENTION

It is an object of the present invention to provide a method of the aforementioned kind with which the thickness and relative position of the layers for a predetermined wall thickness of the socket can be selected freely to a large extent, independent of the function of the layers.

In accordance with the present invention, this is achieved in that in a first step the first material arrangement is formed by extrusion or injection molding to a plane film or plate or to a hose; in that in a second step the film or plate by deep drawing or the hose by blowmolding is formed to a first preform with socket contour; in that in a third step on one side of the first preform the second material arrangement is applied in a socket contour by injection molding, co-injection or monosandwich process; and in that in the case of the first preform formed of a film or plate its bottom is cut out before, during or subsequent to the third step.

In this solution, the thicker material arrangement can form the radially outer or inner material arrangement of the socket, depending on whether the first preform is arranged on the appropriately shaped inner side of the outer wall of an injection mold or on the appropriately shaped outer side of a core of the injection mold for the step of applying the second material arrangement. For obtaining the desired thickness of the second material arrangement, the thickness of the intermediate space between the first preform and the inner side of the wall or the outer side of the core of the mold is selected accordingly. The thickness of the first preform is selected in accordance with the desired wall thickness of the socket in the case of deep drawing or blowmolding. The material of the second material arrangement can be selected in accordance with the desired strength and function of the second material arrangement so that the second material arrangement, on the one hand, serves as a support of the first preform and, on the other hand, fuses with the material of the container, preferably a fuel tank of a motor vehicle, and of the first preform to form a strong fused or welded joint. Conversely, the material of the first preform can be selected such that it fuses with the second material arrangement to form a strong fused or welded connection.

Moreover, it is possible that in the first step a first layer and a second layer and, optionally, a third layer that fuse with one another to a fused joint can be stacked on top one another by coextrusion or layer by layer by injection molding in order to form the film, the plate, or the hose.

In this connection, it can be ensured that one of the layers formed in the first step is a bonding agent or a diffusion barrier relative to hydrocarbons and comprises at least one of the materials PA (polyamide), EVOH (polyethylene-vinyl alcohol copolymer), PE (polyethylene), PET (polyethylene terephthalate), PBT (polybutylene terephthalate), PBN (polybutylene naphthalate), PEN (polyethylene naphthalate), POM (polyacetal), PP (polypropylene), fluoro-thermoplastic synthetic material, PPS (polyphenylene sulfide), and metal, and the second material arrangement is applied on the second layer and at least contains one of the materials PE, PP, PA, PBT, PET, PBN, and POM.

Another one of the layers formed in the first step comprises preferably one of the materials PA, EVOH, PE, PET, PBT, PBN, PEN, POM, PP, fluoro-thermoplastic synthetic material, PPS, and a thermoplastic layer that is made conductive by addition of an electrically conducting additive.

The second material arrangement can be applied to the inner side or the outer side of the first preform.

As an alternative, it is possible that the second material arrangement has a core layer and a skin layer that are produced by co-injection or monosandwich process and that the skin layer and the first material arrangement fuse with one another (are compatible) to form a fused joint. When in this configuration, a predetermined thickness for the second material arrangement is selected, the core layer (for a wall thickness of the socket of, for example, 10 mm and a thickness of approximately only 2 mm for the first material arrangement or the first preform) can have a thickness of 4 mm and the skin layer or the two skin layers located on either side of the core layer (when the skin layer is divided by the core layer into two skin layers) can have a maximum thickness of 4 mm total or 2 mm per skin layer on either side of the core layer.

The material of the skin layer(s) can be PE and that of the core layer can be a diffusion barrier relative to hydrocarbons that comprises at least one of the materials PA, EVOH, PET, PBT, PBN, PEN, POM, fluoro-thermoplastic synthetic material, and PPS.

The diffusion barrier can comprise a reinforcement material, in particular, glass fibers. The core layer can also comprise a reinforcement material, for example, PE or PP, reinforced by glass fibers, glass beads or mineral particles.

Moreover, it is possible that the (one-part) skin layer is applied to the outer side or inner side of the first preform and the second material arrangement has a first end section to be connected to the container that is formed as a flange and has a second end section that is provided externally with at least one holding rib and that the core layer is injected into the ribbed end section up to the flange or into the flange. The core layer that is embodied as a diffusion barrier forms in this way at the same time a reinforcement layer at least in the area between the ribbed end section and the flange because a fluid conduit pushed onto this area is attached thereto generally by clamping with a hose clamp so that this intermediate area must withstand the clamping pressure of the hose clamp without being deformed.

As an alternative, the first material arrangement can have a first layer and a second layer that, according to the first step and the second step, are formed to a first preform and a second preform; in a third step, a first layer of the second material arrangement is injected by injection molding between the first and the second preforms; in the fourth step, into the still plastic core of the first layer of the second material arrangement a third layer can be injected so that the first layer of the second material arrangement forms a skin layer and the third layer forms a core layer.

Moreover, it is possible that in the first step three layers of the first material arrangement are formed to the film, the plate or the hose in order to then produce therefrom the first preform according to the second step and that a second three-layer preform, produced by repeating the steps 1 through 3, is arranged together with the first three-layer preform in a mold such that an intermediate space is left between the preforms and that into the intermediate space the second material arrangement in the form of a skin layer and a core layer is injected by co-injection or monosandwich process.

When the socket has a first socket-shaped three-layer material arrangement that is produced by co-injection or monosandwich process at least predominantly from thermoplastic synthetic material, according to a second solution of the object to be solved in accordance with the present invention it is provided that the skin layer of the first material arrangement is fused to a second material arrangement, comprised at least predominantly of thermoplastic synthetic material that fuses with the skin layer of the first material arrangement to form a fused joint.

In this connection, deep drawing or blowmolding is no longer needed in order to form the first preform of the first material arrangement. Still, the first material arrangement as a preform can be formed to be thinner than the second material arrangement.

In this connection, the second material arrangement can be applied onto the first material arrangement by injection molding so that it has the required thickness in order to impart to the socket the required strength.

In accordance with the second solution, it is also possible that the first material arrangement as a preform is arranged in a mold, that a third material arrangement is produced as a three-layer configuration by co-injection or monosandwich process at least predominantly from thermoplastic synthetic material and is arranged as a second preform in the mold with an intermediate space relative to the first preform, and that the second material arrangement is injected into the intermediate space and fuses with the skin layers of both preforms to a fused joint.

Moreover, the second material arrangement can be of a single-layer configuration, predominantly comprised of PE or PA and provided largely with the same thickness as the two preforms together or can be thicker in order to impart to the socket the required stability and strength.

Moreover, according to the second solution the second material arrangement can be formed between the two preforms as a three-layer configuration by co-injection or monosandwich process and its skin layers can fuse with the skin layers of the two preforms to form a fused joint.

The skin layers of the first material arrangement can comprise PE and the core layer can be provided with a diffusion barrier for hydrocarbons.

The skin layers of the second material arrangement can also comprise PE and its core layer can have a diffusion barrier for hydrocarbons or can comprise a reinforcement material.

The diffusion barrier of the second material arrangement comprises preferably PA or EVOH and the core layer of the second material arrangement has preferably substantially the same thickness as its two skin layers together or is thicker.

DE 199 53 746 C2 discloses moreover a method for producing a socket for connecting a fluid conduit to a container made of thermoplastic synthetic material wherein the socket comprises a first, a second, and a third rotation-symmetrical material arrangements that are primarily comprised of thermoplastic synthetic material. The first material arrangement comprises at least one layer and encloses the second material arrangement. The third material arrangement encloses the first material arrangement. The first, second, and third material arrangements are connected by fused joints and form a flange of the socket facing the container. The first material arrangement and the second material arrangement extend up to a surface of the flange to be connected to the container.

Relative to this disclosure, one solution of the object in accordance of the present invention resides in that in a first step the first material arrangement is formed by extrusion molding or injection molding to a plane film or plate or to a hose, that in a second step the film or plate is formed by deepdrawing or the hose by blowmolding to a preform, that in a third step the second material arrangement is applied to one side of the preform by injection molding, that in a fourth step the third material arrangement is injected in the area of the flange to encapsulate an end section of the first material arrangement that is facing away from the surface to be connected to the container, and that, in the case of the preform made of film or plate, the bottom of the preform is cut out before, during, or after the third step.

In this connection, the method according to the invention is carried out only in the area of the flange of the socket.

In this third method, the first material arrangement can have a diffusion barrier, the second material arrangement can comprise polyethylene, and the third material arrangement can also have a diffusion barrier. The material of the diffusion barriers can also be at least one of the materials mentioned above that have a diffusion barrier capability for hydrocarbons. Preferably, this material is PA.

Also, the first material arrangement and the third material arrangement can comprise electrically conducting particles in this third solution. In this way, it is achieved that the socket (when the third material arrangement comprises predominantly PE) is electrically conducting across its entire length in order to prevent electrostatic charging of the socket.

Moreover, in the first step of the third solution the first material arrangement can be produced as a multiple layer arrangement by coextrusion wherein at least one of the layers is electrically conducting. Since this electrically conducting layer is in contact with the third material arrangement, in this case electric conductivity is also imparted to the socket across its entire length.

A fourth solution of the aforementioned object resides in that, based on the prior art method mentioned above, in the first step one of the two material arrangements is shaped in a first mold cavity to a preform with socket contour, in that in a second step the other one of the two material arrangements in a second molding cavity is molded onto the first preform, and that the synthetic material of one of the two material arrangements that comes into contact with the fluid conduit when being connected comprises an electrically conducting additive.

In this solution, already in the first step the first preform and in the second step the entire socket can be molded. When the fluid conduit is electrically conducting for avoiding electrostatic charging during filling of the container, for example, a tank of a motor vehicle, with a hydrocarbon such as gasoline or diesel fuel through the fluid conduit, the entire connection, comprised of the fluid conduit and the socket connected directly to the container, is protected against electrostatic charging.

In this connection, the synthetic material of one of the material arrangements can provide a diffusion barrier for hydrocarbons and the synthetic material of the other material arrangement can fuse with the synthetic material of the container for forming a fused joint.

It is particularly beneficial when the synthetic material of the thinner material arrangement is provided with diffusion barrier capability. Because synthetic materials that provide diffusion barrier action, as mentioned above, cannot undergo fusing with the container that is usually predominantly comprised of PE, it would be sufficient when only the thicker material arrangement to be fused to the PE of the container provides the fused joint to the container because the connecting surface at the socket end facing the container is correspondingly larger and therefore provides a secure joint.

As an alternative to the use of the synthetic material capable of forming a diffusion barrier for one of the material arrangements, preferably the thinner one, a layer capable of providing a diffusion barrier for hydrocarbons and extending across more than 50%, preferably more than 90%, of the length of the corresponding material arrangement, can be injected into at least one of the two material arrangements by co-injection or monosandwich process and the synthetic material of the material arrangement or of each material arrangement into which the diffusion barrier is injected, can fuse with the container material to form a fused joint. The diffusion barrier can be very thin so that even the material arrangement or both material arrangements provided with the diffusion barrier will form a secure fused joint with the container.

A further possibility in regard to the fourth solution resides in that the thicker material arrangement comprises a synthetic material that will fuse with the container to a fused joint and in that the diffusion barrier that is injection molded into it extends across less than 100% of the length of the thicker layer. In the second step, the thinner material arrangement, comprising the conductive additive, is fused across the entire inner side of the thicker material arrangement past the end of the thicker material arrangement, which end is facing away from the surface to be connected to the container, and is formed to a holding rib for the fluid conduit projecting past the outer side of the thicker material arrangement. The thicker material arrangement can remain free of conductive additives such as particles of graphite, metal, or carbon, for example, carbon black, or an additive of electrically conducting so-called nano tubes that do not fuse with the container but have a relatively large ratio of length to diameter so that they ensure an electrically conducting connection through the entire socket. Moreover, the surface of the thicker material arrangement that is to be connected to the container remains relatively large so that it can form a solid fused connection with the container.

Preferably, it is ensured that the two material arrangements comprise PE, that into the PE of at least one of the two material arrangements a first layer is injection molded by co-injection or monosandwich process; the first layer is fusible with PE and with a synthetic material that provides a diffusion barrier for hydrocarbons to form a fused joint. Into the first layer, a second layer containing the synthetic material providing a diffusion barrier for hydrocarbons is injection molded by co-injection or monosandwich process. In this way, it is ensured that the diffusion pressure or the vapor pressure at higher temperatures of the hydrocarbon, for example, fuel in the form of gasoline or diesel fuel that diffuses through PE, cannot lift the PE from the diffusion barrier so that it would finally flake off. At the same time, the different swelling behavior of the diffusion barrier and of PE would not lead to the PE being lifted off the diffusion barrier. Inasmuch as the diffusion barrier is injection molded only into, or additionally into, the radially outwardly positioned material arrangement of the socket, through the formation of a fused joint between the diffusion barrier and the surrounding PE the risk that the PE would be lifted off and removed from the diffusion barrier by mechanical forces would be avoided.

In order to provide between the first layer and the polyethylene of the respective material arrangement as well as the diffusion barrier a fused joint that is as strong as possible, it is advantageous when the synthetic material that provides a diffusion barrier relative to hydrocarbon is PA or EVOH and when the first layer comprises PE bonding-modified by maleic acid anhydride and when the synthetic material for providing a diffusion barrier is PA whose terminal amino group concentration is identical to or greater than 40 milliequivalents per kilogram.

In this embodiment, it is beneficial when the first and the second layers of one material arrangement extend across more than 50%, preferably more than 90%, of the length of this material arrangement. The diffusion barrier capability of the socket is then ensured across a large portion of the length of the socket.

When in this connection the first and the second layers of the thicker material arrangement extend across less than 100%, but still more than 50%, preferably more than 90%, of the length of the thicker material arrangement, in this configuration of the socket a relatively large contact surface between the thicker material arrangement and the container is ensured and, in this way, a strong connection between the socket and the container is achieved.

In cases in which no very high requirements in regard to diffusion barrier capability of the socket are posed, the first and the second single-layer material arrangements can be comprised of synthetic materials that fuse not only with one another but also with the container to provide a fused joint. In this connection, only one material arrangement must contain the electrically conducting additive; preferably, this is the radially inner material arrangement that can be thinner than the radial outer material arrangement. When the container comprises PE or HDPE, both material arrangements may also comprise primarily PE.

Since only one material arrangement comprises the conducting additive, the entire socket, despite the presence of the additive that increases the material costs, can be produced at lower cost than a single-layer configuration of the entire socket comprising a conductive additive. The other material arrangement has because of the lack of the conducting additive a higher chemical resistance and stress crack resistance. Since both material arrangements also fuse to a fused joint with the container, the melted synthetic material of the conducting material arrangement cannot penetrate into the space between the other material arrangement and the container and cannot impair its connection to the container.

Moreover, in the first step the thicker material arrangement should be formed. The thicker material arrangement determines then not only the mechanical strength of the socket and its connection to the container, if it does not comprise an electrically conducting additive, but also forms at the same time also the support for the thinner and thus less mechanically loadable material arrangement.

DESCRIPTION OF THE PREFERRED EMBODIMENTS

Figure 1:
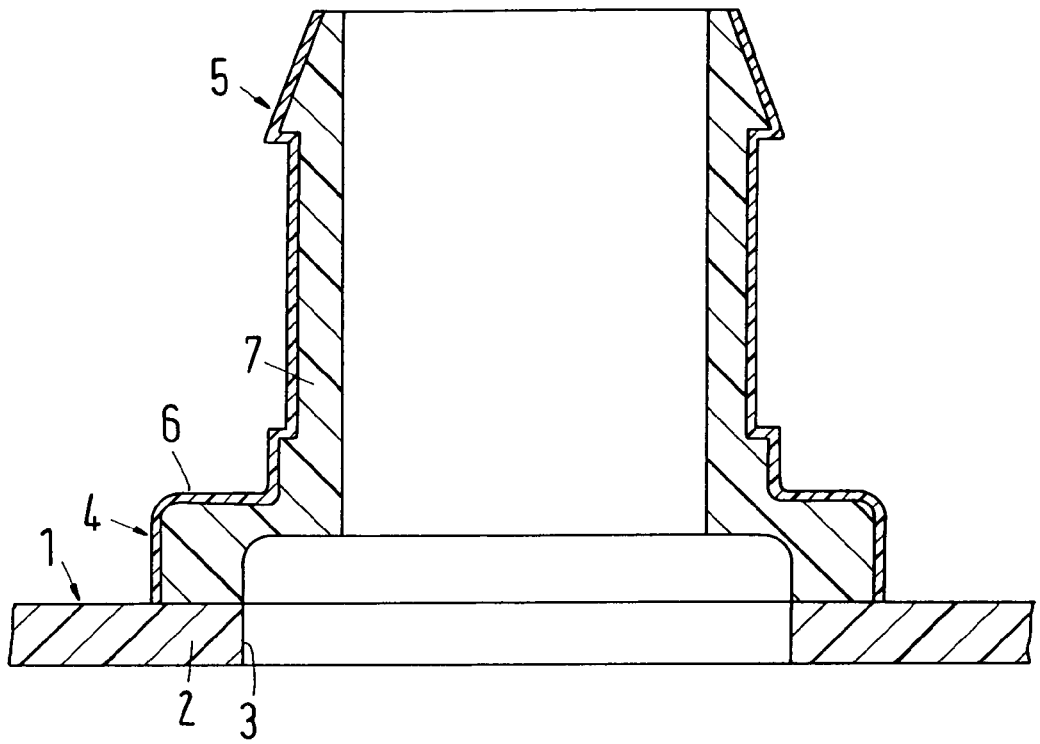
FIG. 1 shows a socket that is produced by the method according to the invention in accordance with a first embodiment.

The sockets illustrated in FIGS. 1 through 12 are of a multi-layer configuration and serve for connecting a fluid conduit (illustrated only in FIGS. 13, 15, and 18), for example, a hose of synthetic material that is diffusion-tight, to the container 1 comprised predominantly of synthetic material and used for hydrocarbons, for example, a fuel tank of a motor vehicle for gasoline or diesel fuel of which only a wall 2 with fill opening 3 is illustrated. The fluid conduit can be provided additionally with an electrically conducting additive against electrostatic charging. Each socket is comprised also at least predominantly of thermoplastic synthetic material and is connected by fusing to the rim of the fill opening 3, in this embodiment by welding, so that a fused joint between the socket and the container 1 will result. For each socket, the end section facing the container is provided with a circumferential flange 4 and the end section facing away from the container 1 is provided with a circumferential securing rib 5. According to FIGS. 1 through 12, the socket is somewhat thinner in the area between the flange 4 and the securing rib 5. When connecting a fluid conduit, the fluid conduit is pushed onto the socket across the securing rib 5 onto the thinner area of the socket and is clamped by means of a hose clamp in this area.

While the container 1 essentially comprises HDPE (high-density polyethylene) with an intermediate layer (not illustrated) of PA or EVOH that is a diffusion barrier for hydrocarbons, the socket according to FIG. 1 is provided externally with a single layer first material arrangement 6 that is comprised predominantly of thermoplastic synthetic material; in the illustrated embodiment, the diffusion-barrier material is PA, EVOH, PET, PBT, PBN, PEN, POM, fluoro-thermoplastic synthetic material, PPS. On the inner side, the socket has a second mono-layer or single-layer material arrangement 7 that is also comprised predominantly of thermoplastic synthetic material, in this embodiment PE, that is compatible, i.e., fusible, with the synthetic material of the container 1 and the first material arrangement 6 so as to produces a fused joint. If required, the second material arrangement 7 can be modified with regard to bonding for obtaining a fused joint. The thermoplastic synthetic material of the first material arrangement 6 can comprise additionally electrically conducting particles, for example, graphite or metal. The second material arrangement 7, on the other hand, is preferably reinforced, for example, by glass fiber or carbon fiber.

The socket according to FIG. 1 is manufactured in that in a first step the first material arrangement 6 is formed to a plane film or plate or a hose by extrusion molding or injection molding, wherein in a second step the film or plate by deep drawing or the hose by blowmolding is formed to a first preform having a socket contour and wherein in a third step on one side of the first preform the second material arrangement 7 is applied by injection molding with a socket contour. In the case of the first preform being made from film or plate, the first preform has its bottom cut out before, during or after the third step.

In this connection, the two material arrangements 6 and 7, while maintaining the desired wall thickness of the socket, can have different thickness, i.e., the first material arrangement 6 can be, for example, very thin, as is sufficient for a diffusion barrier, and the second material arrangement 7 can be selected to be appropriately thick so that it can serve as a support for the first material arrangement 6 and provide the desired strength of the socket and of its connection to the container 1.

A special advantage of this method resides in that in this way also material arrangements can be connected to one another that cannot be connected in only a single injection molding step (by a coextrusion method), for example, a continuous, axially extending metal layer and a plastic layer because of their very different melting temperatures. Metal has a much higher melting temperature than thermoplastic synthetic material so that the synthetic material would decompose at the higher melting temperature of the metal.

Figure 2:
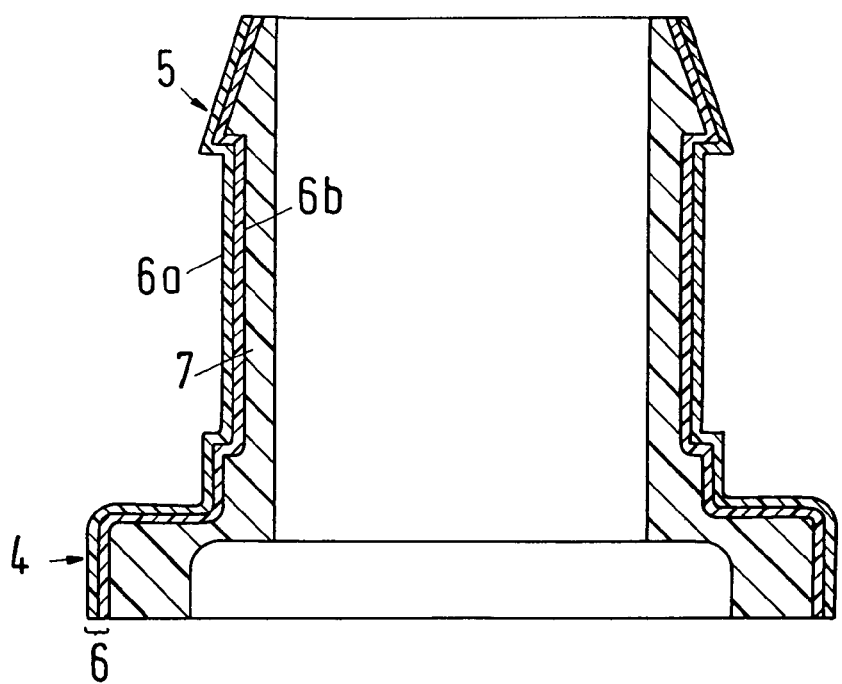
FIG. 2 shows a socket that is produced by the method according to the invention in accordance with a second embodiment.

In the embodiment according to FIG. 2, the first material arrangement 6 is comprised of a first layer 6a and a second layer 6b that are fused together, produced by coextrusion or placed layer by layer by injection molding above one another in order to form the film, the plate or the hose. Subsequently, in the case of the plane film or plate, the material arrangement is deepdrawn or, in the case of the hose, blowmolded in order to form the socket-shaped first preform. The second material arrangement 7 is then injection molded into the first preform in the same way as in the embodiment according to FIG. 1. The thickness ratios can be selected to be similar to the first embodiment. While the materials of the second material arrangement 7 are selected to be the same as in the first embodiment, the materials of the layers 6a and 6b of the first material arrangement 6 are selected to be different from those of the first embodiment. The outer layer 6a is a diffusion barrier of the same materials as the first material arrangement 6 according to FIG. 1, and the middle layer 6b can be in the form of a bonding agent. However, it is also possible to make the layer 6b a diffusion barrier and the outer layer 6a, for example, from PE or PA wherein the middle layer 6b again must be compatible (fusible) with the layers 6a and 7.

Instead of forming the first material arrangement 6 comprised of the layers 6a and 6b to the first preform by deep drawing and blowmolding, it is also possible to produce the first preform of the layers 6a and 6b in a mold by a multi-component injection molding process (one layer after another).

Figure 3:
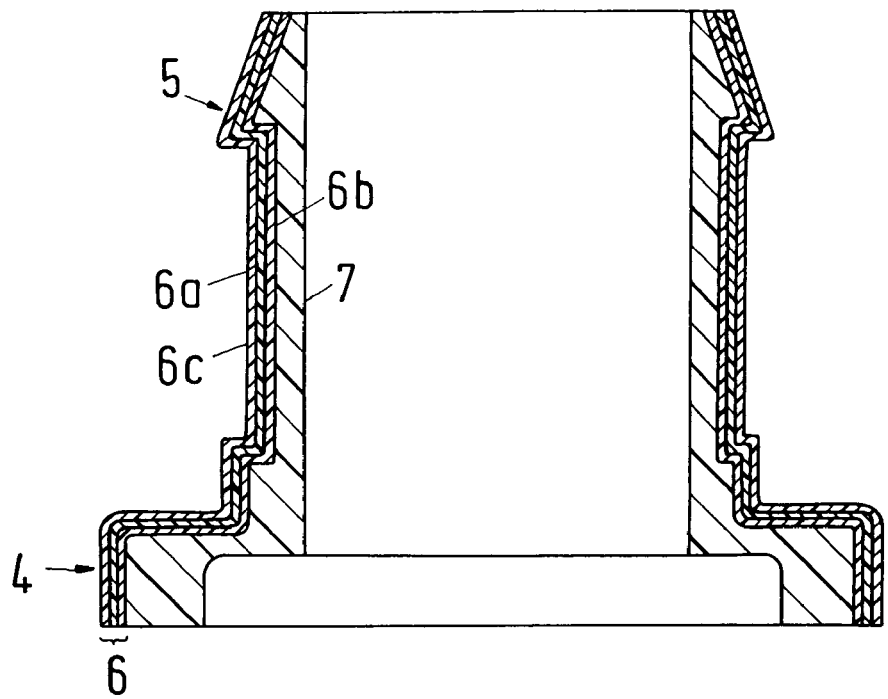
FIG. 3 shows a socket that is produced by the method according to the invention in accordance with a third embodiment.

In the embodiment according to FIG. 3, the first material arrangement 6 is comprised of three layers 6a-6c, whose materials are selected such that they fuse with the neighboring layer, respectively, to form a fused joint. Likewise, the layer 6b undergoes fusing with the second material arrangement 7. The layers 6a-6c are first stacked by a coextrusion injection molding method or layer by layer by injection molding to a plane film or plate or a hose. From this layer arrangement the first preform is then produced by deepdrawing or blowmolding; the first preform is then arranged subsequently in an injection mold and the second material arrangement 7 is injected into the interior of the first preform. From the deepdrawn cup-shaped first preform, the bottom is cut out before, during or after injection of the second material arrangement 7.

The layers 6a-6c are as a whole at most as thick as the second material arrangement 7 when the wall thickness of the socket is again only of the same thickness as in the first embodiment. Of the three layers 6a-6c at least two are comprised of different materials, wherein one can be fused to the second material arrangement 7. For example, the radially outer layer 6c is electrically conducting because of an additive, the middle layer 6a is a barrier layer, and the radially inner layer 6b is a bonding agent that enables the connection between the middle layer 6a and the second material arrangement 7 that, in turn, comprises PE in order to be able to connect it to the container 1 by melting but does not fuse with a barrier layer as a middle layer 6a that comprises, for example, PE or EVOH, inasmuch as the PE of the second material arrangement 7 has not been modified with regard to bonding such that it can fuse with PA or PE to a fused joint.

Alternatively, the outer layer 6c can also contain bonding-modified PE, the middle layer 6a can comprise PA or EVOH, and the second material arrangement 7 can also comprise bonding-modified PE. For the same total wall thickness, the PE of the outer layer 6c would then compensate the somewhat reduced thickness of the second material arrangement 7 in comparison to the second embodiment according to FIG. 2 for providing the same strength of the socket.

Figure 4:
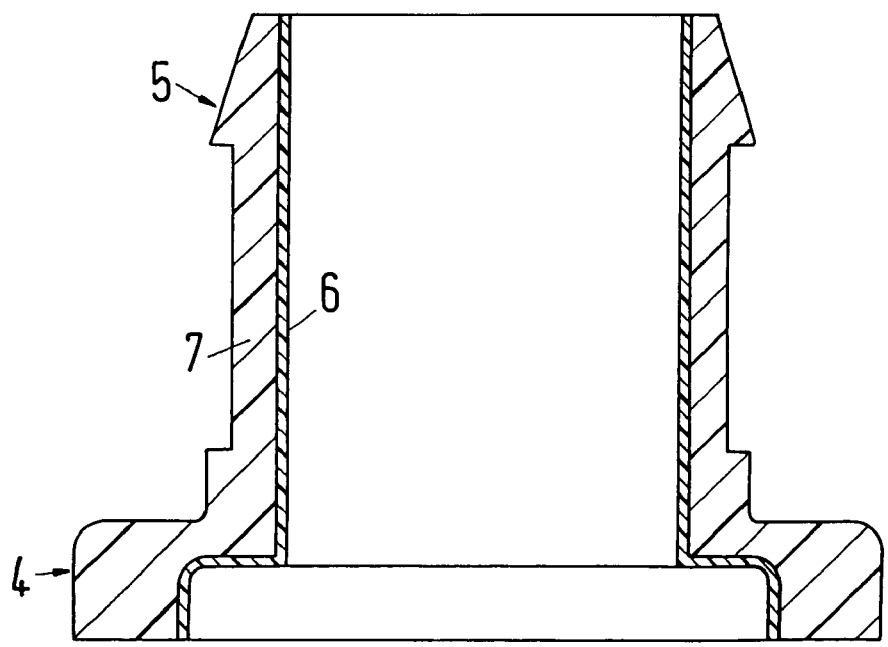
FIG. 4 shows a socket that is produced by the method according to the invention in accordance with a fourth embodiment.

In the embodiment according to FIG. 4, the two material arrangements 6 and 7 are switched relative to those of FIG. 1. This means that the first material arrangement 6 is arranged radially inwardly and the second material arrangement 7 is arranged radially outwardly while the manufacture is carried out in the same way as in the first embodiment of FIG. 1. First, the material arrangement 6 is produced as a first preform of the plane film or plate by deepdrawing or is produced from the hose by blowmolding. Onto the exterior of the first preform, the second material arrangement 7 is then injection molded by an injection molding method, wherein the bottom of the deepdrawn form is cut out before, during or after injection molding the second material arrangement 7. The materials of the two material arrangements 6 and 7 can be identical to that of the first embodiment.

Figure 5:
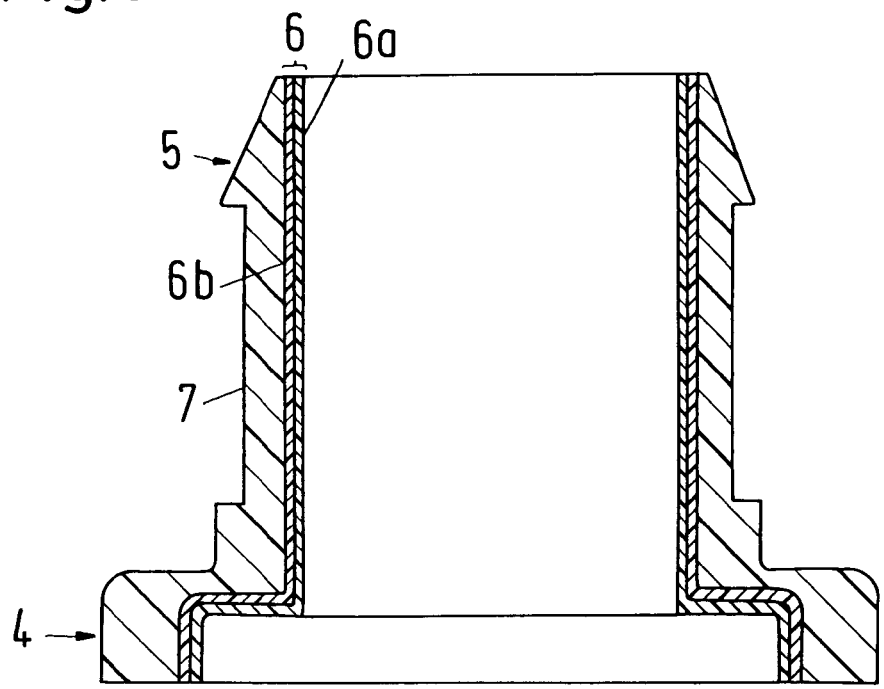
FIG. 5 shows a socket that is produced in accordance with the present invention in accordance with a fifth embodiment.

In the embodiment according to FIG. 5, only the position of the two material arrangements 6 and 7 is switched relative to the first and second embodiments. The manufacturing process and the materials are identical to those of the second embodiment.

Figure 6:
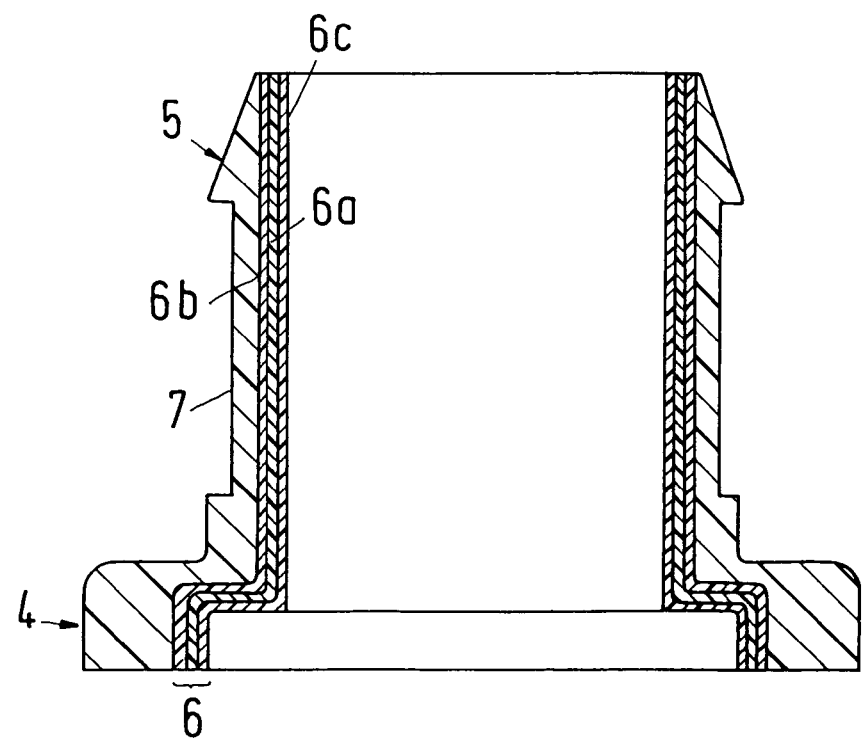
FIG. 6 shows a socket that is produced by the method according to the invention in accordance with a sixth embodiment.

In the embodiment according to FIG. 6 only the sequence of the materials 6 and 7 is switched relative to FIG. 3 while the manufacturing method and the materials of the material arrangements 6 and 7 are the same as in the embodiment of FIG. 3.

Figure 7:
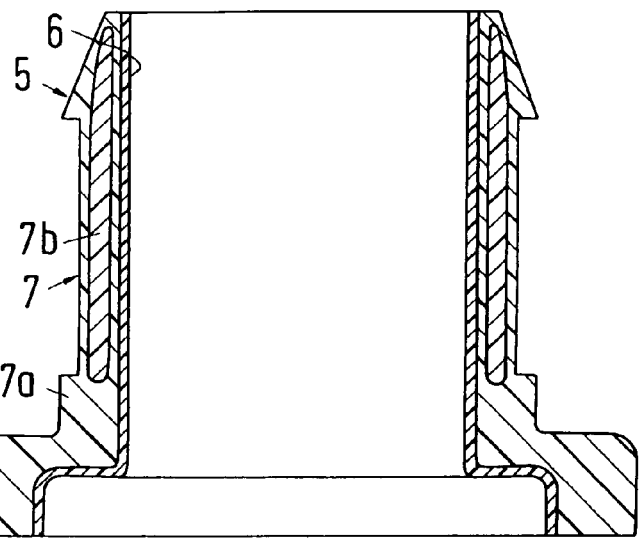
FIG. 7 shows a socket that is produced by the method according to the invention in accordance with a seventh embodiment.

In the embodiment according to FIG. 7 the sequence of the materials 6 and 7 is switched relative to that of FIG. 1. The second material arrangement 7 is comprised, however, of two layers, a skin layer 7a and a core layer 7b that is injected into the still plastic core of the skin layer 7a by co-injection or monosandwich process after the skin layer 7a has been injected by injection molding onto the exterior of the material arrangement 6 that provides the first preform produced according to the first embodiment. The core layer 7b may comprise a reinforcement material, for example, glass fibers or carbon fibers, or can form an additional barrier layer, when the inner material arrangement 6 forms a diffusion barrier, for example, of PA or EVOH.

The core layer 7b extends from the end section of the socket provided with the securing rib 5 across the thinner middle area of the socket up to the flange 4 in order to embody the somewhat thinner area so to be loadable to a greater degree in regard to the clamping pressure of the hose clamp when the core layer 7b is configured as a reinforcement layer. Alternatively, the core layer 7b can also be designed as an additional diffusion barrier when the first material arrangement 6 is also designed as a diffusion barrier in order to increase the diffusion barrier capability of the socket.

Figure 8:
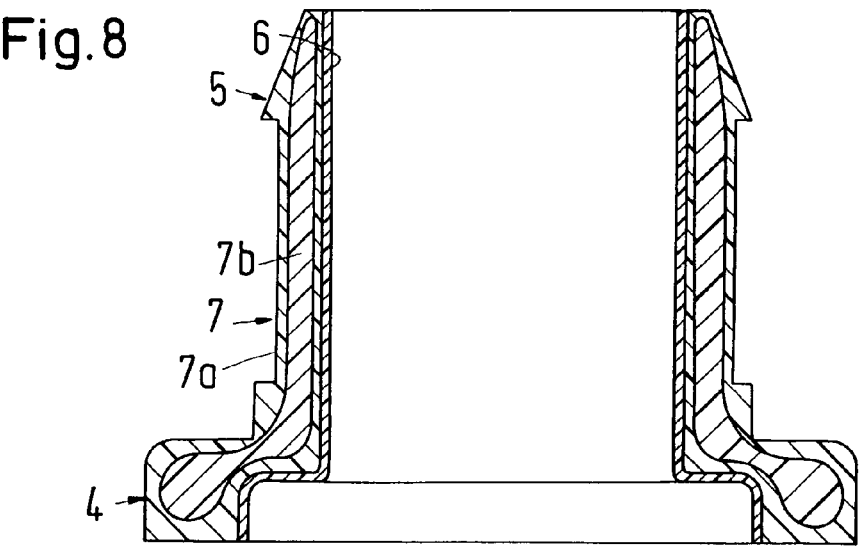
FIG. 8 shows a socket that is produced by the method according to the invention in accordance with an eighth embodiment.

The embodiment according to FIG. 8 differs from that of FIG. 7 only in that the core layer 7b is longer so that it extends into the flange 4 in order to increase the strength or diffusion barrier capability of the socket even more.

Figure 9:
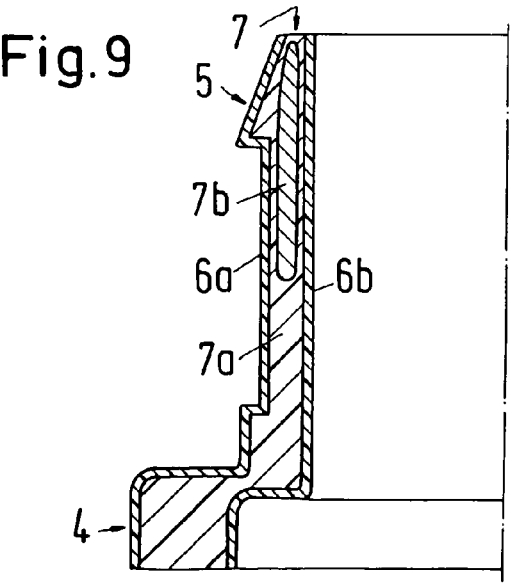
FIG. 9 shows a socket that is produced by the method according to the invention in accordance with a ninth embodiment.

In the embodiment according to FIG. 9, the first material arrangement 6 has a first layer 6a and a second layer 6b that are formed in accordance with the same method used for the first preform of the first material arrangement 6 in the embodiment according to FIG. 1 by the first and second steps to a first preform and a second preform, respectively. The two preforms 6a, 6b are then arranged at a spacing relative to one another that corresponds to the desired thickness of the second material arrangement 7 in an appropriately shaped injection mold, and, subsequently, a first layer 7a of the second material arrangement 7 is injected by injection molding into the space between the first preform and the second preform, i.e., between the layers 6a and 6b and into the still plastic core of the first layer 7a of the second material arrangement 7 a third layer 7b of the second material arrangement 7 is injection molded by co-injection or monosandwich process.

In this connection, the outer layer 6a can comprise thermoplastic synthetic material with electrically conducting particles and the inner layer 6b can comprise PA or EVOH that is capable of forming a diffusion barrier, while the layer 7a contains modified PE and the middle layer 7b can comprise reinforcement material; all layers that contact one another can be fusible to one another. Since the layer 7b is enclosed in the material of the layer 7a, it is however not mandatorily required that the layer 7b can be fused (is compatible) to the layer 7a. Moreover, the layer 7b can be injected axially farther, for example, up to or into the flange 4.

Figure 10:
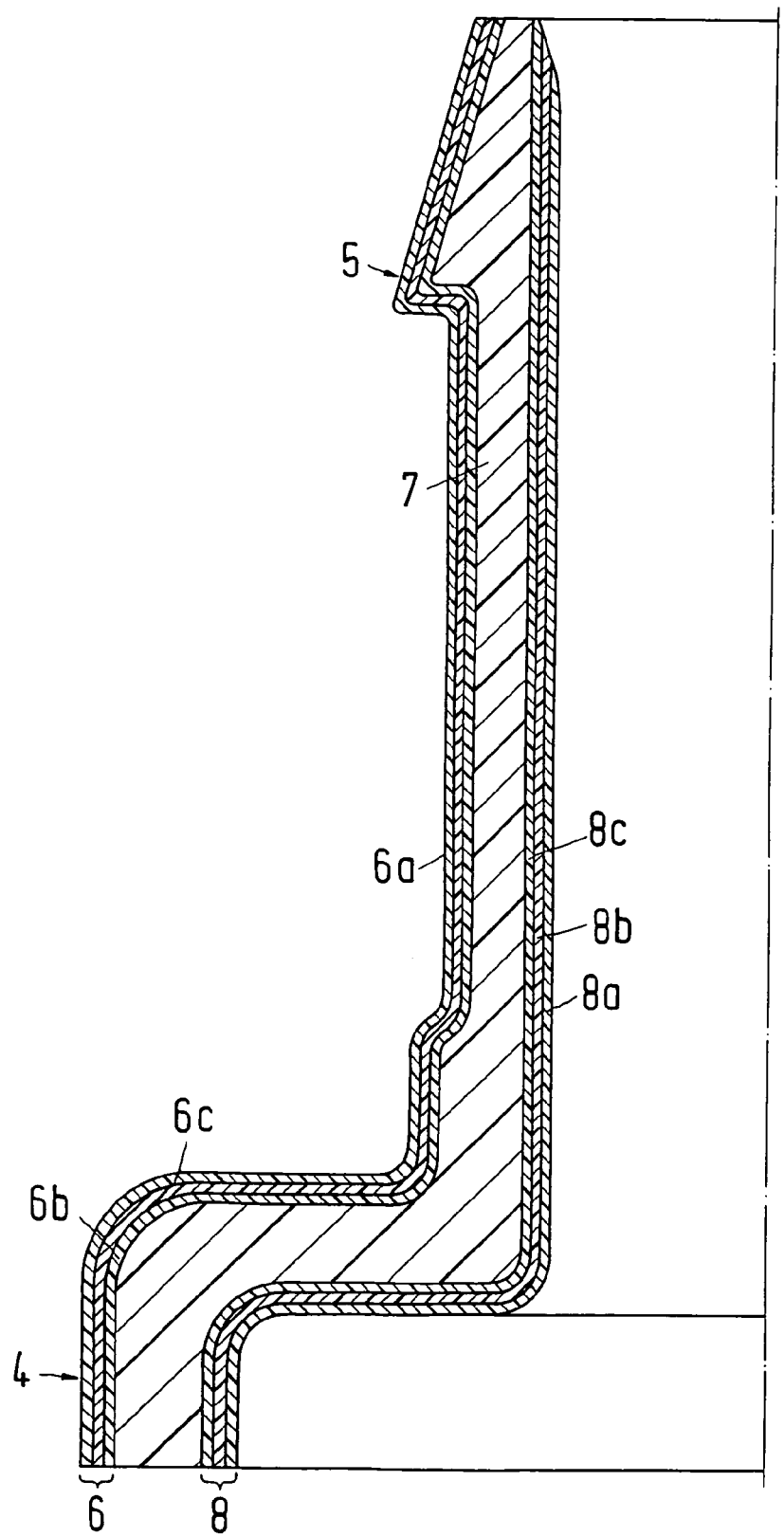
FIG. 10 shows a socket that is produced by the method according to the invention in accordance with a tenth embodiment.

In the embodiment according to FIG. 10 (showing only one half of the socket because the other half is symmetrical to the first half as in the preceding embodiments), the socket is produced of a first socket-shaped material arrangement 6 comprising three layers 6a, 6b, 6c; a second socket-shaped but single-layer or mono-layer material arrangement 7; and a third socket-shaped material arrangement 8 with three layers 8a, 8b, and 8c. All arrangements are comprised at least predominantly of thermoplastic synthetic material.

The first material arrangement 6 is produced by co-injection or monosandwich process as a first preform so that its outer layers 6a and 6b form a skin layer and its inner layer 6c forms a core layer which is approximately of the same thickness up to twice the thickness of each of the layers 6a and 6b.

The layers 6a and 6b comprise PE while the layer 6c comprises PA or EVOH and forms a diffusion barrier for hydrocarbons. The second material arrangement 7 comprises also PE so that it fuses with the layer 6b to form a fused joint.

The third material arrangement 8 is also produced by co-injection or monosandwich process as a second preform so that its outer layers 8a and 8c form a skin layer and the inner layer 8b forms a core layer. The layers 8a and 8c also comprise PE, while the inner layer 8b comprises PA or EVOH so that the latter provides a diffusion barrier for hydrocarbons. Accordingly, the layer 8c also fuses to a fused joint with the material arrangement 7 because they both comprise PE. While the layers 8a and 8c are approximately of the same thickness, the layer 8b is approximately of the same thickness up to twice the thickness of one of the layers 8a, 8c. This is possible, in the same way as in regard to layer 6c, in that the maximum thickness of the material arrangements 6 and 8 is selected to be 2 times to 4 times the thickness of the skin layers, whose thickness for co-injection or monosandwich process is generally constant at 1 mm to 2 mm, by a correspondingly thin configuration of the cavity of the mold in which the co-injection or monosandwich process for producing the material arrangements 6 and 8 is carried out.

Alternatively, the material arrangements 6 and 8 can however also be produced by a coextrusion injection molding method or their layers can be produced sequentially layer for layer by extrusion injection molding process on top one another to a film or plate or a hose, and subsequently the film or plate can be shaped by deepdrawing and the hose by blowmolding to the first preform or second preform whereupon the two preforms are then arranged with intermediate space between them in a correspondingly shaped injection mold and the second material arrangement 7 is injected into the intermediate space. In the case of deepdrawing preforms, the bottom can be cut out before, during or after the injection of the second material arrangement 7 in order to obtain a socket that is open at both ends. Moreover, it is possible in the embodiment according to FIG. 10 to omit the first material arrangement 6 or the third material arrangement 8.

Figure 11:
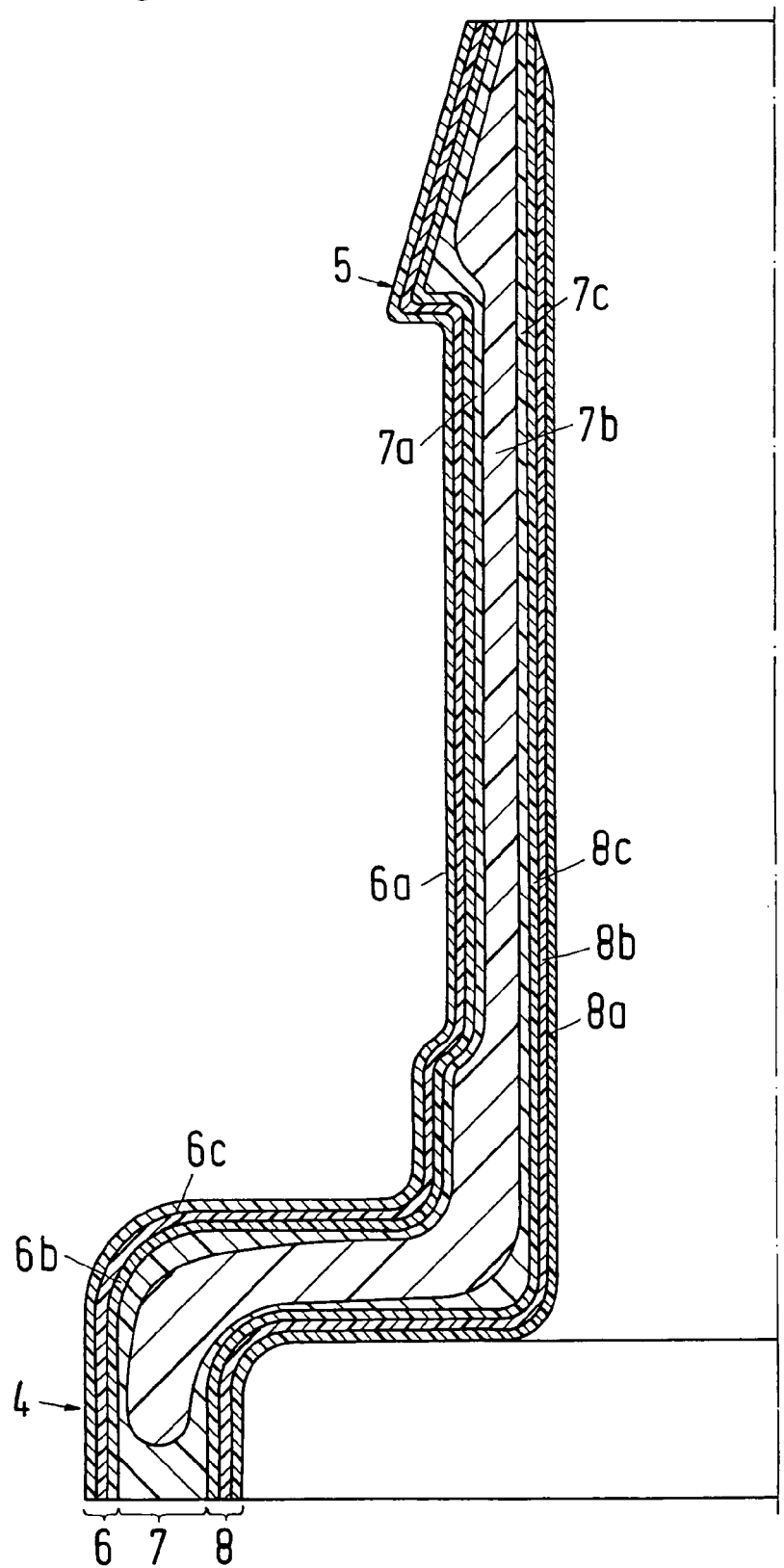
FIG. 11 shows a socket that is produced by the method according to the invention in accordance with an eleventh embodiment.

In the embodiment according to FIG. 11, not only the material arrangements 6 and 8 can be injected as in the embodiment of FIG. 10 by co-injection or monosandwich process but also the second material arrangement 7, after completion of the first preform and the second preform, can be injected in a mold into the intermediate space between these two preforms by co-injection or monosandwich process so that the outer layers 7a and 7c of the second material arrangement 7 also form a skin layer of PE and the inner layer 7b forms a core layer of PA as a diffusion barrier and support layer. On the other hand, the first material arrangement 6 forms on either side of the core layer 6c a skin layer that comprises PA, and it forms a core layer 6c that comprises EVOH and therefore an additional diffusion barrier. The third material arrangement 8 can then comprise skin layers 8a and 8c of PE and a core layer 8b of EVOH as an additional diffusion barrier.

Since the PA of the core layer 7b of the second material arrangement 7 is not completely, as illustrated, injected into the PE up to the lower end of the PE forming the skin layer(s) 7a and 7c to be fused to the container 1, a sufficiently large surface of PE is provided that can fuse with the PE of the container 1 to form a strong fused joint or welded joint. The thickness ratios of the layer can be selected also such that the skin and core layers of the material arrangements 6 and 8, while maintaining the required wall thickness of the socket, can be approximately identically thin while the support layer 7b is relatively thick, approximately as thick as the skin layer(s) 7a, 7c (together) or thicker.

Likewise, in this case the first material arrangement 6 or the third material arrangement 8 can be omitted.

Figure 12:
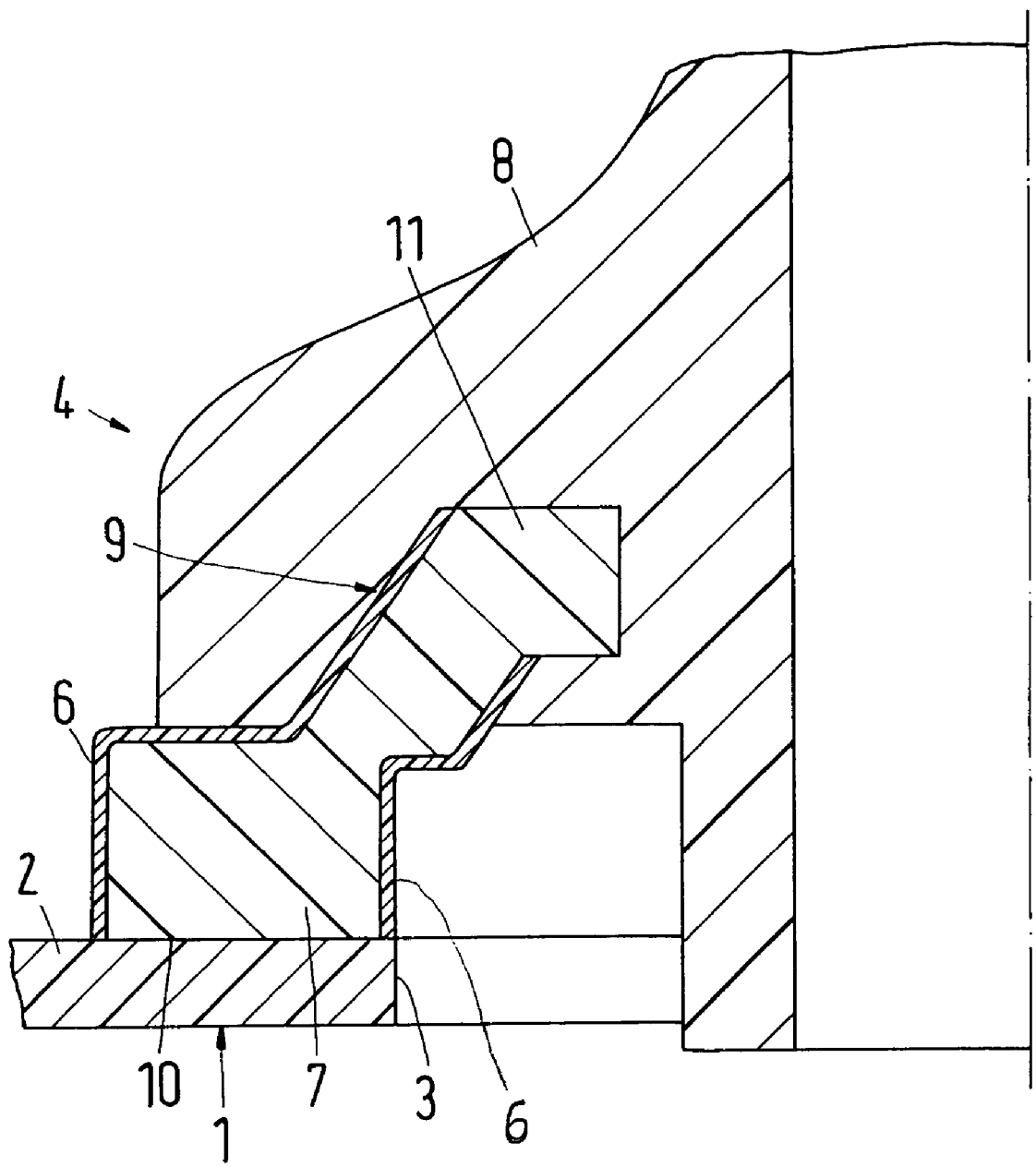
FIG. 12 shows a socket that is produced by the method according to the invention in accordance with a twelfth embodiment.

FIG. 12 represents in axial section one half of a flange 4 of a socket produced in accordance with an additional embodiment of the present invention. The portion that is facing away from the container 1 and is not illustrated is also provided with a securing rib, as disclosed in connection with the preceding embodiments. The socket has also a first material arrangement 6 that is arranged radially outside or inside or, as illustrated, on both sides of a second material arrangement 7, and a third material arrangement 8; as in the preceding embodiments of the socket, they are comprised predominantly of thermoplastic synthetic material. The first material arrangement 6 is of a mono-layer configuration and has a relatively minimal thickness. It surrounds the significantly thicker second material arrangement 7. The third material arrangement 8 surrounds an end section 9 of the first and second material arrangements 6, 7 that is facing away from the surface 10 of the flange 4 to be connected to the container 1. The material arrangements 6, 7, and 8 can fuse with one another to form fused joints.

The manufacture of this socket is realized again in the way that in a first step the first material arrangement 6, i.e., the outer or inner or both, is or are produced by extrusion injection or injection molding to a plane film or plate or to a hose. In a second step, the film or plate is again formed by deep-drawing or the hose by blowmolding to a preform that has the angled shape illustrated in FIG. 12. However, at least the transitions of the material arrangement 6 or of the preform made therefrom must not pass at an angle into the end section 9. The transition areas can also be round.

In a third step, the second material arrangement 7 is applied to one side of the preform formed of the outer or inner material arrangement 6 or both by injection molding (insert molding). In the fourth step, the third material arrangement 8 is injected by injection molding to embed in the area of the flange 4 the end section 9 of the first and second material arrangements 6, 7. In this connection, a part 11 of the second material arrangement 7 that is not covered by the material arrangement 6 is covered by the material arrangement 8. In the case of a preform made from the film or plate, the bottom of the preform is cut out before, during or after the third step.

The first material arrangement 6 has a diffusion barrier, the second material arrangement 7 comprises polyethylene (PE), and the third material arrangement 8 also has a diffusion barrier for hydrocarbons. The diffusion barrier materials can be the same materials as mentioned above in connections with the preceding embodiments. Preferably, the material is PA or EVOH.

The first material arrangement 6 and the third material arrangement 8 contain electrically conducting particles, for example, particles of metal, graphite or carbon. Since the first material arrangement 6 and the third material arrangement 8 contact one another, across the entire length of the socket a conducting layer for preventing electrostatic charging of the socket is provided.

In the first step, the first material arrangement 6 or its film or plate can be produced also by a coextrusion method in a multi-layer configuration instead of a single layer configuration; at least one of the multiple layers is electrically conducting.

In as much as the first material arrangement 6, as illustrated, covers the radial outer as well as the radial inner side of the second material arrangement 7, the PE of the second material arrangement 7 that is substantially not capable of a diffusion barrier function is covered by a double diffusion barrier. In contrast to this, the thicker second material arrangement 7 can undergo fusing across the large annular surface 10 with at least the outer layer of the container 1 that also contains PE so as to form a mechanically highly loadable strong fused connection by welding.

A further alternative can reside in that in the second material arrangement 7, before it has completely hardened, a further layer is injected by co-injection or monosandwich process.

Figure 13:
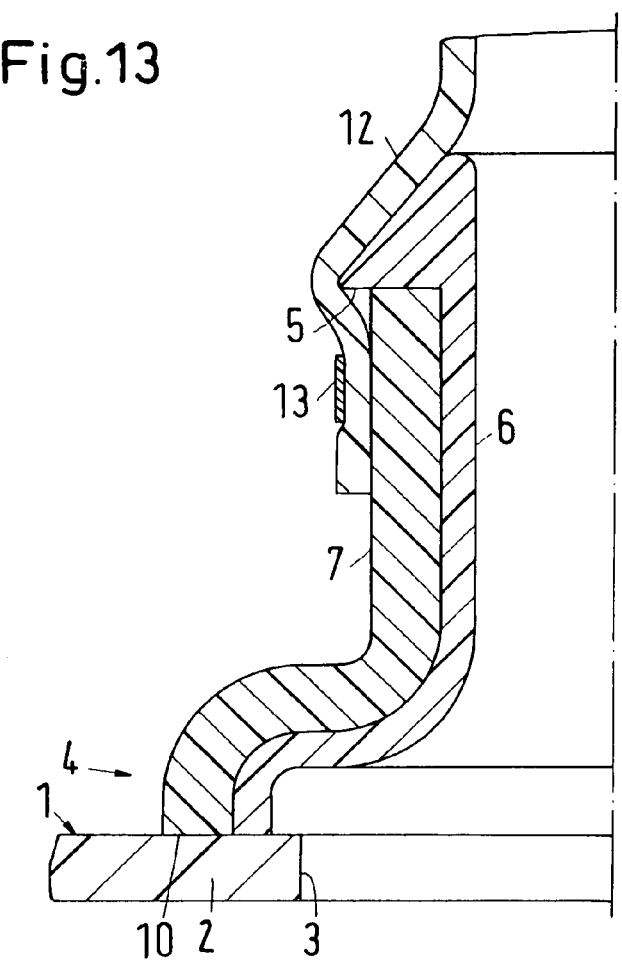
FIG. 13 shows a socket that is produced by the method according to the invention in accordance with a thirteenth embodiment.

In the embodiment of the socket according to FIG. 13 showing only one half of the socket that is axis-symmetrical to the dash-dotted central line, the thinner material arrangement 6 is positioned inwardly and the thicker material arrangement 7 is positioned outwardly. Even though the material arrangement 6 is approximately half as thick as the material arrangement 7, it can also be much thinner. It could also be somewhat thicker than illustrated but should be thinner than 70% of the thickness of the material arrangement 7.

The material arrangement 6 comprises predominantly one of the aforementioned synthetic materials that provide a diffusion barrier relative to hydrocarbons such as gasoline or diesel fuel and contains an electrically conducting additive. The additive can be, for example, particles of graphite, metal, or carbon, for example carbon black, or so-called electrically conducting nano tubes. Nano tubes have the advantage that they have a relatively large ratio of length to diameter of approximately 100 so that, as a whole, they provide with relatively high reliability a continuous electrically conducting connection across the entire length of the material arrangement 6. The amount of additives is selected such that the electrical resistance of the material arrangement 6 is in the range of $100\Omega$ to $10^7\Omega$, preferably approximately $1,000\Omega$ to $10,000\Omega$, so that the material arrangement 6 will not be electrostatically charged when filling the container 1.

The material arrangement 7 comprises predominantly PE that, in contrast to the synthetic material providing a diffusion barrier, undergoes fusing with the HDPE of the container to form a fused joint.

At least one of the two material arrangements 6 and 7 is bonding-modified so that they can undergo fusing with one another to a fused joint. When the synthetic material of the material arrangement 6 that is capable of providing a diffusion barrier is bonding-modified in such a way that it undergoes fusing with the PE of the material arrangement 7 to a fused joint, it can also undergo fusing with the HDPE of the container 1 to form a fused joint.

When manufacturing the socket according to FIG. 13, in a first step the thicker material arrangement 7 is molded in a first mold cavity to a preform having the illustrated socket contour, i.e., having an elongate cylindrical section and a flange 4. In a second step, the thinner material arrangement 6 is then molded in a second mold cavity to produce the illustrated socket contour and at the same time fused to the first preform of the material arrangement 7 in such a way that the thinner material arrangement 6 is fused to the thicker material arrangement 7 across its entire inner side and past the end of the material arrangement 7 that is facing away from the surface 10 to be connected to the container 1 and is shaped to the securing rib 5 that projects past the outer side of the material arrangement 7.

After the socket has been fused to the outer side of the wall 2 of the container 1 in the area of the surface 10, for example, by friction welding or butt welding, the fluid conduit 12 in the form of a hose can be pushed past the conical annular surface of the securing rib 5 into a position behind the securing rib 5 onto the socket and, if needed, can be secured by clamping by means of a hose clamp 13. When the fluid conduit 12 also comprises an electrically conducting additive, the entire connection from a fill socket attached to the end of the fluid conduit 12 that is not illustrated across the fluid conduit 12 and the material arrangement 6 to the container 1 is electrically conducting so that during filling of the container 1 it cannot become electrostatically charged. When the container 1 additionally has an electrically conducting layer that covers its external side from the opening 3 to the inner edge of the surface 10, the conducting connection also extends into the container 1. This conducting layer would impair or prevent a fused joint of the material arrangement 6 with the container 1. However, because of the electrically conducting additive in the material arrangement 6, the material arrangement 6 would hardly fuse with the container 1 even without the presence of the conducting layer on the container 1. Since the material arrangement 7 in comparison to the material arrangement 6 is relatively thick, the large surface area connection between the material arrangement 7 and the container 1 can determine essentially alone the strength of the connection between the socket and the container 1. For the same reason, the material arrangement 7 as the support of the thinner material arrangement 6 is capable by itself to ensure a sufficient mechanical strength of the socket 7. The electrical connection between the fluid conduit 12 and the securing rib 5 of the material arrangement 6 also enables that the material arrangement 7 remains free of an electrically conducting additive that at least impairs fusing to form a fused joint between the material arrangement 7 and the container 1.

However, in principle it would be possible also to produce the material arrangement 7 to be thinner than the material arrangement 6 from predominantly a synthetic material capable of providing a diffusion barrier and comprising an electrically conducting additive, while the material arrangement 6 is produced to be much thicker than the material arrangement 7 and is made predominantly of a synthetic material that will fuse to the synthetic material of the container 1 without the total contour of the socket being changed by this. The electrically conducting connection would then be realized across the material arrangement 7 to the container 1. In this variant, only a conducting layer of the container 1 extending from its opening 3 under the rim of the material arrangement 6 facing the container up to or underneath the rim of the material arrangement 7 facing the container would not be advisable because then the material arrangement 6 would fuse only with difficulty to the container 1. The sequence of producing the preforms out of the material arrangements 6 and 7 would then only be reversed. In the first step the preform of material arrangement 6 and in the second step the preform of the material arrangement 7 would be molded and at the same time fused to the material arrangement 6, i.e., would be applied in the still molten state.

Figure 14:
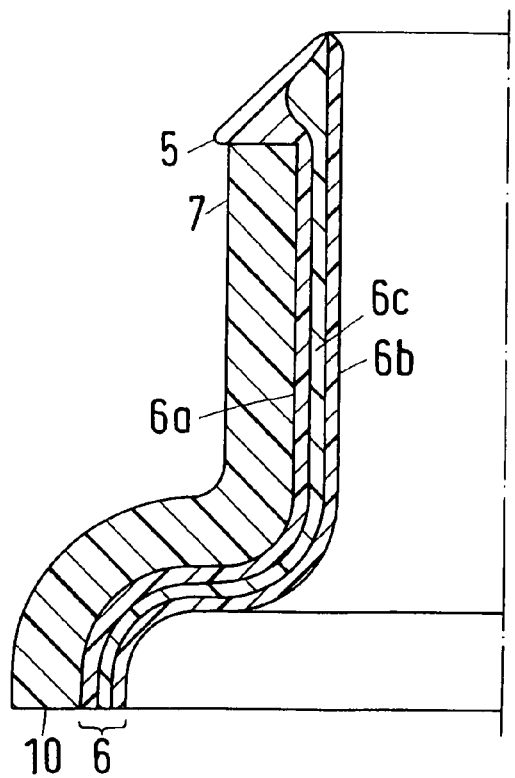
FIG. 14 shows a socket that is produced by the method according to the invention accordance with a fourteenth embodiment.

The embodiment of the socket according to FIG. 14 (the container 1 and the fluid conduit 12 are omitted in this illustration) differs from that of FIG. 13 only in that the thinner material arrangement 6, with the exception of an inner first layer 6c is formed of the same material as the thicker material arrangement 7 and the layer 6c, comprised of the aforementioned diffusion-barrier synthetic materials, preferably PA or EVOH, is injected by co-injection or monosandwich process from the pointed end of the material arrangement 6 into the area of the material arrangement 6 that is still molten in the interior as a result of the injection molding process. In this connection, the layers 6a and 6b form a skin layer of the second preform and the layer 6c forms a thinner core layer of the second preform that extends across the entire length of the socket. The skin layer is again provided with an electrically conducting additive while the inner layer 6c can also be provided with a conducting additive and is bonding-modified so that it can undergo fusing with the PE of the skin layers 6a, 6b.

Figure 15:
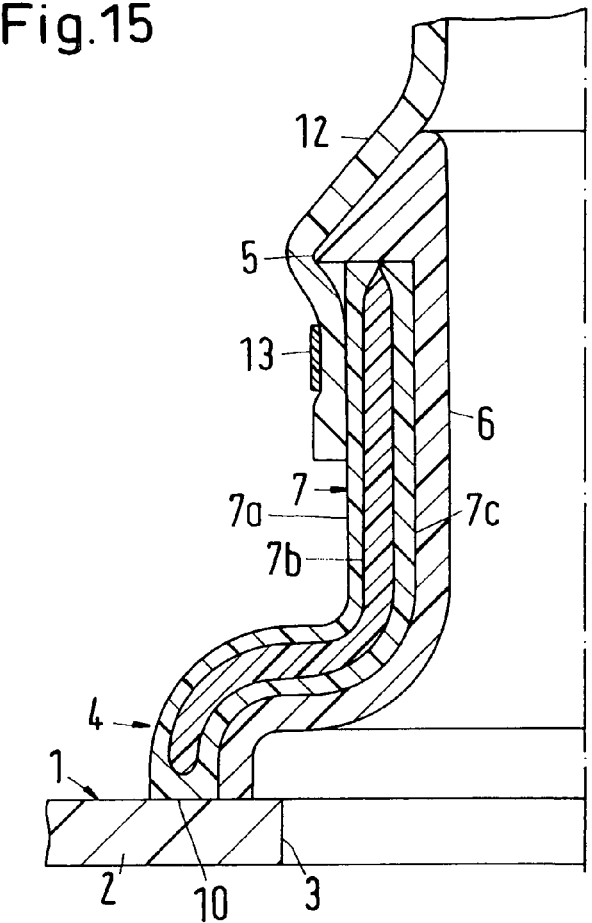
FIG. 15 shows a socket that is produced by the method according to the invention in accordance with a fifteenth embodiment.

The embodiment of the socket according to FIG. 15 differs from that of FIG. 13 only in that into the material arrangement 7 during the first step a first layer 7b of one of the aforementioned synthetic material providing a diffusion barrier, preferably PA or EVOH, is injected by co-injection or monosandwich process. In this connection, the layer 7b extends from the end of the material arrangement 7 that is facing away from the end to be welded to the container 1 and forms the sprue across more than 50%, preferably more than 90% but less than 100% of the length of the socket, up into the flange 4 i.e., not into the end to be welded, so that the PE of the material arrangement 7 can still undergo fusing with the surface 10 on the container 1 during welding to form a strong fused joint. In this configuration, the layer 7b essentially requires no fused joint with the PE of the (skin) layers 7a, 7c of the material arrangement 7 because it is enclosed completely by the layers 7a, 7c of the material arrangement 7. Since the material arrangement 6 comprises already a synthetic material capable of forming a diffusion barrier, the layer 7b can comprise alternatively another thermoplastic synthetic material that is not capable of forming a diffusion barrier but increases the mechanical strength of the material arrangement 7. In particular, a reinforcement material can be provided in the layer 7b, for example, glass fibers or carbon fibers.

Figure 16:
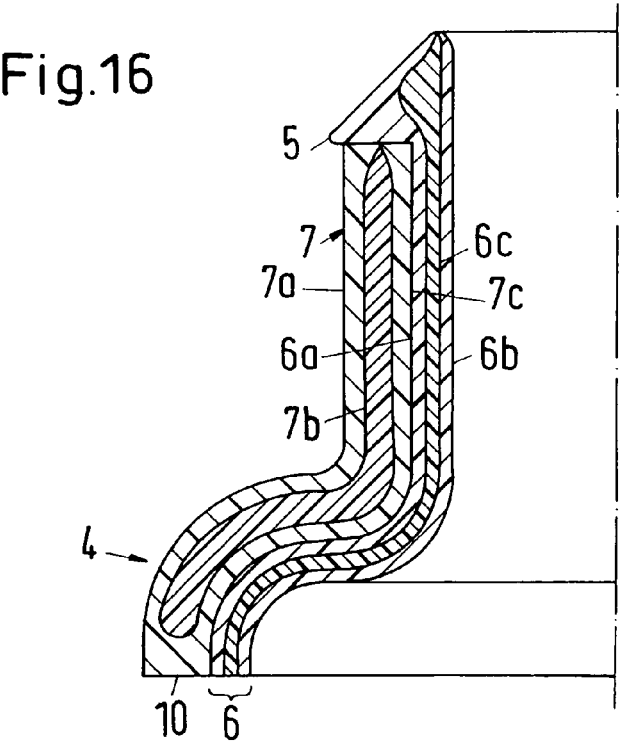
FIG. 16 shows a socket that is produced by the method according to the invention in accordance with a sixteenth embodiment.

In the embodiment of the socket according to FIG. 16, the material arrangement 6 is comprised of the same layers 6a, 6c, prepared in the same step and of the same materials as the material arrangement 6 of FIG. 14, while the material arrangement 7 in the embodiment according to FIG. 16 is configured in the same way as the material arrangement 7 of the embodiment of FIG. 15.

Alternatively, the material arrangements 6 and 7 in the embodiments according to FIGS. 14 to 16 can have at least one additional layer that is produced by co-injection or monosandwich process.

Figure 17:
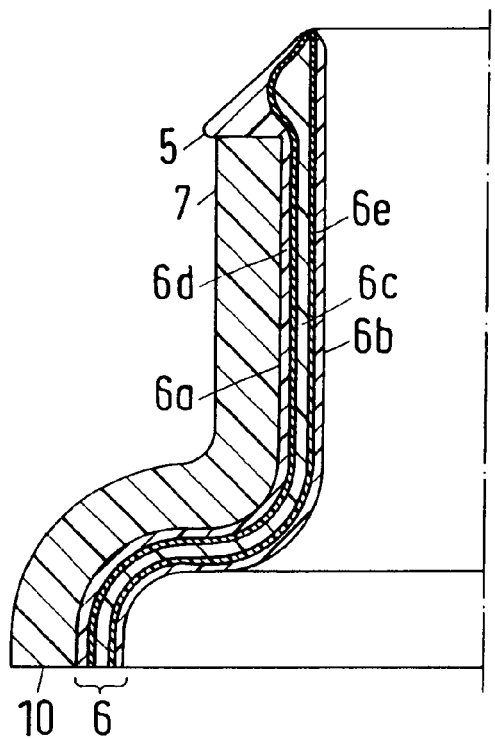
FIG. 17 shows a socket that is produced by the method according to the invention in accordance with a seventeenth embodiment.

The embodiment of the socket according to FIG. 17 differs from that of FIG. 13 essentially in that the two material arrangements 6 and 7 during the manufacture of the socket—aside from the conducting additive, in the present case carbon, in the material arrangement 6—initially comprise PE and during the injection of the material arrangement 6 into its still molten core (the "heart") while the skin comprised of the layers 6a, 6b is already substantially hardened, from the injection location at the pointed end of the socket a first layer 6d, 6e is injected by co-injection or monosandwich process. The first layer 6d, 6e comprises PE that is grafted with maleic acid anhydride. Accordingly, the layer 6d, 6e is bonding-modified relative to PA or EVOH providing a diffusion barrier action for hydrocarbons such as gasoline or diesel fuel.

Into the core of the first layer 6d, 6e, after their skin layers 6d and 6e have substantially hardened but their core is still molten, a second layer 6c is injected by co-injection or monosandwich process. This layer 6c comprises PA or EVOH. When PA is injected as layer 6c, its terminal amino group concentration is selected to be identical to or greater than 40 milliequivalents per kilogram. In this way, the layer 6d, 6e can fuse to a fixed fused joint not only with the PE of the material arrangement 6 (6a, 6b) but also with the layer 6c. Since the container 1 comprises PE or HDPE and the material arrangement 7 also comprises PE, both still undergo fusing to a fixed fused joint with one another when the socket is welded to the container 1. Since the material arrangement 6 comprises a conductive additive in the layers 6a, 6b, it does not form a very strong fused joint with the container 1. In particular, it will not fuse with the container 1 to a fixed fused joint when the container 1 has a conductive coating that covers the opening 3 of the container 1 and its outer side from the opening 3 up to the radial outer rim of the end of the material arrangement 6 facing the container 1, wherein a continuous conducting connection from the fluid conduit 12, not illustrated in FIG. 17, across the layer 6a, 6b up to the container 1 is created. Even when the terminal amino group concentration of the PA layer 6c is identical to or greater than 40 milliequivalents per kilogram, it does not undergo fusing with (HD)PE of the container 1. However, the connection between PA of the layer 6c and the PE layers 6a, 6b is stronger when the bonding-modified layers 6d and 6e are provided. As a whole, because of the thicker material arrangement 7 a very strong connection between the socket and container 1 is provided.

Even though the diffusion barrier 6c is enclosed in the material arrangement 6 by the layers 6a, 6b, it is still advantageous to fuse it with the layers 6a, 6b and to join it with them in this way (by the layers 6d and 6e). This is so because it is possible that gasoline or diesel fuel can diffuse through the layer 6b into the space between it and the layer 6c; because of the diffusion pressure and/or vapor pressure (the latter in particular at higher temperatures) of the fuel that has passed through the layer by diffusion and because of the different swelling behavior of PE and PA (PE swells more than PA), the layer 6b could then be lifted off the layer 6c.

It would be possible to modify the layers 6a and 6b with maleic acid anhydride, so that the first layer 6d, 6e could be eliminated. PE that is not modified with regard to bonding by maleic acid anhydride, as that of the layers 6a and 6b, has however the advantage that it can be made conducting more easily, e.g., by adding electrically conducting additives, such as carbon, in comparison to PE that has been bonding-modified by maleic acid anhydride.

Figure 18:
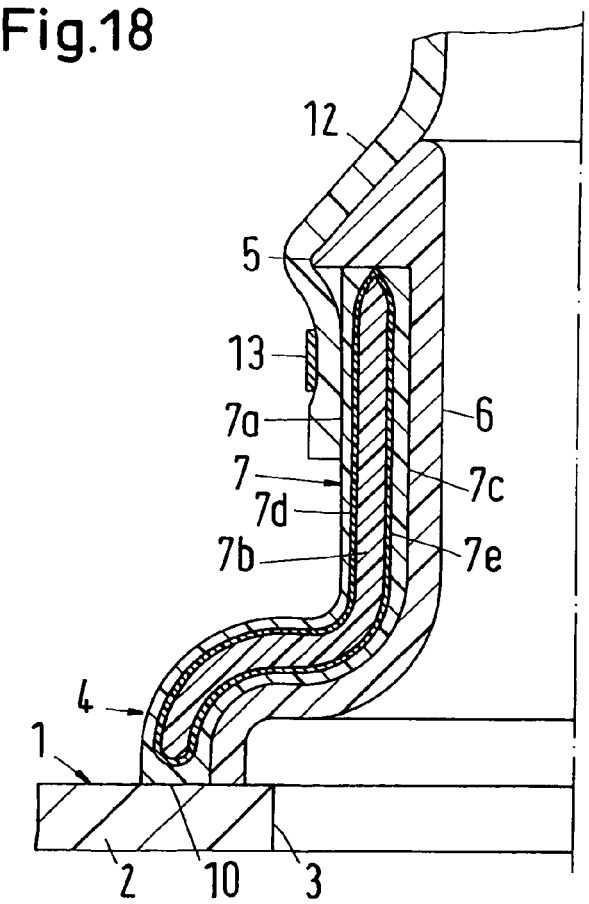
FIG. 18 shows a socket that is produced by the method according to the invention in accordance with an eighteenth embodiment.

The embodiment of the socket according to FIG. 18 differs from that of FIGS. 15 and 17 in that the first layer 7d, 7e and the second layer 7b injected into it and providing a diffusion barrier are injected into the material arrangement 7. The first layer 7d, 7e comprises therefore the same material as the first layer 6d, 6e according to FIG. 17 and the diffusion barrier 7b the same material as the second layer 6c according to FIG. 17. In this case, the radially outer skin layer 7a of the material arrangement 7 is protected additionally by the bonding-modified layer 7d, 7e against lifting or detaching from the diffusion barrier 7b because of outer mechanical forces, for example, friction forces, that act onto the layer 7a.

Figure 19:
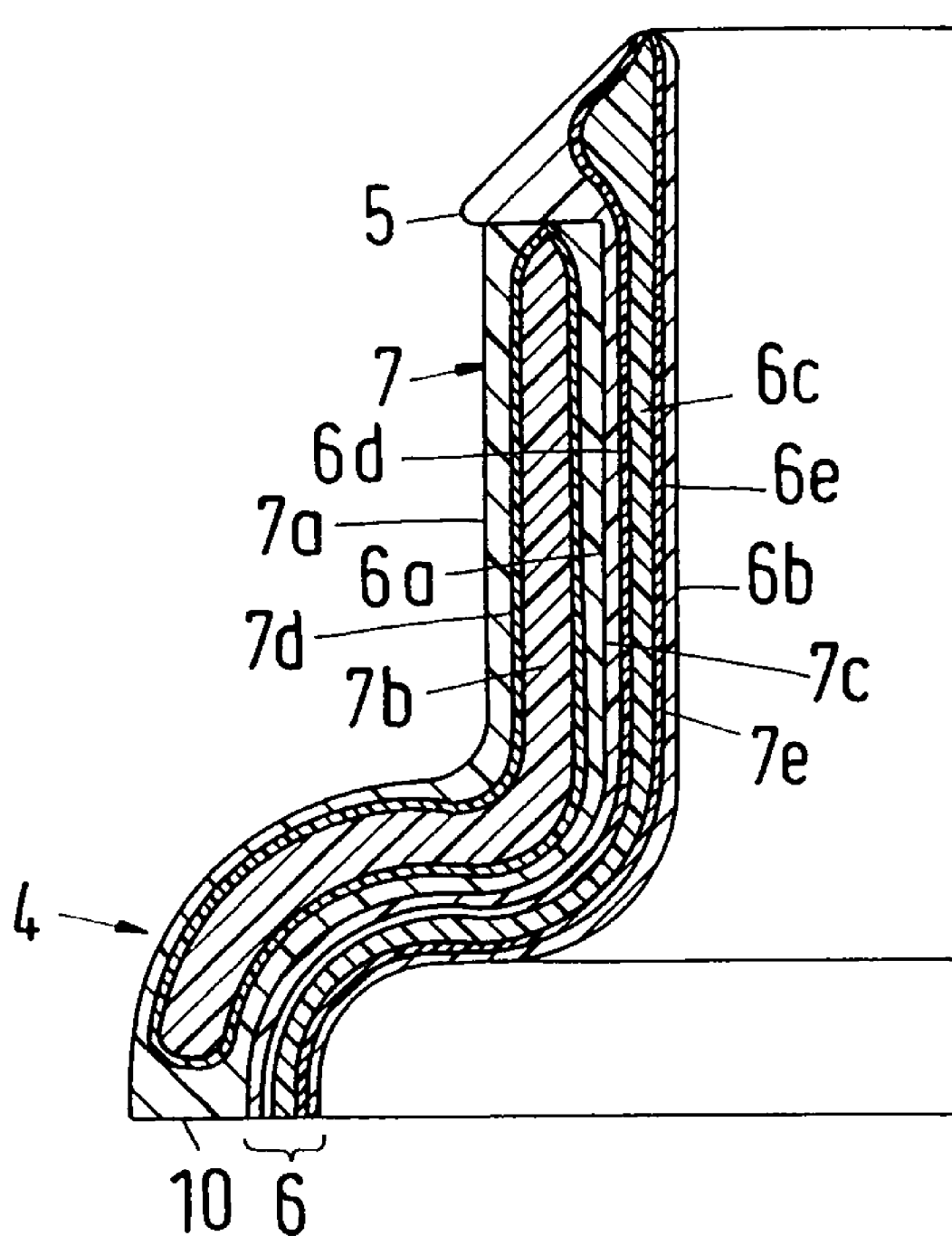
FIG. 19 shows a socket that is produced by the method according to the invention in accordance with a nineteenth embodiment.

The embodiment of the socket according to FIG. 19 provides a combination of the layers of the material arrangement 6 according to FIG. 17 with the layers of material arrangement 7 according to FIG. 18. It combines thus the advantages of both embodiments according to FIGS. 17 and 18 and increases the diffusion barrier capability by using two diffusion-barrier layers, i.e., the two layers 6c and 7b.

In cases in which no very high requirements in regard to diffusion barrier capability of the socket are posed, both material arrangements can be comprised of synthetic materials that not only fuse with one another but also with the container 1 in order to form a fused joint wherein only one material arrangement, preferably the radially inner material arrangement that is thinner than the radial outer material arrangement 7, requires the electrically conducting additive. When the container 1 comprises PE or HDPE, both material arrangements 6 and 7 can also comprise PE.

Since only one material arrangement 6 contains the conducting additive, the entire socket, despite the fact that the conducting additive increases the material costs, can be produced less expensively in comparison to a mono-layer configuration of the entire socket comprising conducting additives. Because of the lack of conducting additives, the material arrangement 7 has a higher chemical resistance and stress crack resistance. Because both material arrangements 6 and 7 also undergo fusing with the container to form a fused joint, the melted synthetic material of the conducting material arrangement 6 cannot penetrate into the space between the material arrangement 7 and the container 1 and cannot impair its connection to the container 1.

While specific embodiments of the invention have been shown and described in detail to illustrate the inventive principles, it will be understood that the invention may be embodied otherwise without departing from such principles.

What is claimed is:

1. A method for manufacturing a socket for connecting a fluid conduit to a container made from thermoplastic synthetic material, wherein the socket has a first socket-shaped material arrangement comprising at least two layers and a second socket-shaped material arrangement comprising at least two layers, wherein the first material arrangement is thinner than the second material arrangement and the first and second material arrangements both comprise a thermoplastic material at least as a predominant component and fuse with one another to form a fused joint; the method comprising the steps of:
   1) molding the first material arrangement by extrusion or injection molding to a plane film or plate or to a hose;
   2) deepdrawing the film or the plate or blowmolding the hose to a first preform with a socket contour;
   3) applying the second material arrangement onto one side of the first preform in a socket contour by injection molding, coinjection or a monosandwich process, wherein the first material arrangement comprises a first layer and a second layer, wherein the first and second layers are prepared according to the steps 1) and 2) to form the first perform and a second preform, respectively, wherein in the step 3) a first layer of the second material arrangement is injected by injection molding, coinjection or a monosandwich process between the first and second preforms, and wherein in an additional step 4) into a still plastic core of the first layer of the second material arrangement a third layer is injected so that the first layer of the second material arrangement forms a skin layer and the third layer forms a core layer.

2. The method according to claim 1, further comprising, when the first preform is molded from the film or the plate, the step of cutting out a bottom of the first preform before, during or subsequent to the step 3).

3. The method according to claim 1, wherein in the step 1) a first layer and a second layer and optionally a third layer that are fusing with one another are stacked by co-extrusion or layer by layer by injection molding to form the film or the plate or the hose.

4. The method according to claim 3, wherein one of the first, second, and third layers is a binding agent or a diffusion barrier for hydrocarbons, wherein said one layer comprises at least one of the materials selected from the group consisting of PA, EVOH, PE, PET, PBT, PBN, PEN, POM, PP, fluoro-thermoplastic synthetic material, PPS, and metal, and wherein the second material arrangement is applied onto the second layer and comprises at least one of the materials selected from the group consisting of PE, PP, PA, PBT, PET, PBN, and POM.

5. The method according to claim 4, wherein another one of the first, second, and third layers comprises at least one of the materials selected from the group consisting of PA, EVOH, PET, PBT, PBN, PEN, POM, PP, fluoro-thermoplastic synthetic material, and PPS and further comprises a thermoplastic layer that is electrically conductive by addition of an electrically conducting additive.

6. The method according to claim 3, wherein in the step 1) the first material arrangement comprises three layers that are shaped to the film or the plate or the hose and in the step 2) the first preform is made from the film or the plate or the hose, wherein the steps 1) and 2) are repeated for the first material comprising three layers to prepare a second preform, further comprising the steps of arranging the first and second preforms in a mold so as to create an intermediate space between the first and second preforms and injecting by coinjection or a monosandwich process into the intermediate space the second material arrangement comprising a skin layer and a core layer.

7. The method according to claim 1, wherein the second material arrangement is applied to an inner side or an outer side of the first preform.

8. The method according to claim 1, wherein the second material arrangement comprises a core layer and a skin layer that are produced by coinjection or a monosandwich process, wherein the skin layer and the first material arrangement fuse with one another to form a fused joint.

9. The method according to claim 8, wherein the skin layer comprises PE and the core layer is a diffusion barrier for hydrocarbons and comprises at least one of the materials selected from the group consisting of PA, EVOH, PET, PBT, PBN, PEN, POM, PP, fluoro-thermoplastic synthetic material, and PPS.

10. The method according to claim 9, wherein the diffusion barrier comprises a reinforcement material.

11. The method according to claim 10, wherein the reinforcement material is glass fiber.

12. The method according to claim 10, wherein the skin layer is applied to an outer side or an inner side of the first preform and wherein the second material arrangement has a first end section and a second end section, wherein the first end section that is to be connected to a container is shaped as a flange and wherein the second end section is shaped to have at least one outer securing rib, wherein the core layer is injected into the second end section up to or into the flange.

13. A method for producing a socket for connecting a fluid conduit to a container made from thermoplastic synthetic material, wherein the socket has a first socket-shaped three-layer material arrangement produced by coinjection or a monosandwich process at least predominantly from thermoplastic material; the method comprising the steps of:
providing a second material arrangement comprised at least predominantly of thermoplastic material;
fusing a skin layer of the first material arrangement to the second material arrangement to form a fused joint;
preparing a first preform from the first material arrangement;
producing a three-layer second preform as a third material arrangement by coinjection or a monosandwich process predominantly of thermoplastic synthetic material;
arranging the first preform and the second perform in a mold so that an intermediate space is created between the first and second preforms;
injecting the second material arrangement into the intermediate space, wherein the second material arrangement fuses with a skin layer of the first and second preforms, respectively.

14. The method according to claim 13, wherein the second material arrangement is applied by injection molding onto the first material arrangement.

15. The method according to claim 13, wherein the second material arrangement is a single layer and comprises predominantly PE or PA and has a thickness that is substantially identical to or thicker than a combined thickness of the first and second preforms.

16. The method according to claim 13, wherein the second material arrangement is comprised of three layers that are coinjected or produced by a monosandwich process, wherein two of the three layers are skin layers that fuse to the skin layers of the first and second preforms.

17. The method according to claim 16, wherein the skin layers of the second material arrangement comprise PE and wherein a core layer of the second material arrangement comprises a diffusion barrier for hydrocarbons.

18. The method according to claim 17, wherein the diffusion barrier of the second material arrangement comprises PA or EVOH.

19. The method according to claim 17, wherein the core layer of the second material arrangement has a thickness that is substantially identical to or thicker than a combined thickness of the skin layers of the second material arrangement.

20. The method according to claim 13, wherein the first material arrangement has skin layers and a core layer, wherein the skin layers comprise PE and the core layer comprises a diffusion barrier for hydrocarbons.

* * * * *